United States Patent [19]
Herold et al.

[11] 3,895,900
[45] July 22, 1975

[54] PLASTICS EXTRUSION DIE HEAD IMPROVEMENT

[75] Inventors: Albert J. Herold, Bedford; Paul E. Koch, Chagrin Falls; Richard C. Adams, Chardon, all of Ohio

[73] Assignee: The Standard Oil Company, Cleveland, Ohio

[22] Filed: Feb. 21, 1974

[21] Appl. No.: 444,341

[52] U.S. Cl. ............................ 425/466; 425/326 P
[51] Int. Cl. ........................................ P29d 23/04
[58] Field of Search .............. 425/326 B, 381, 46 B; 264/98

[56] References Cited
UNITED STATES PATENTS
3,144,682   8/1964   Thiefoldt ............................ 425/381
3,390,430   7/1968   Lynch et al. ................. 425/326 B X FOREIGN PATENTS OR APPLICATIONS
641,340   5/1962   Canada .......................... 425/326 R Primary Examiner—R. Spencer Annear
Attorney, Agent, or Firm—John F. Jones; Sherman J. Kemmer

[57] ABSTRACT

An improved plastic extrusion blow molding die head is described which permits the formation of extruded parisons having controlled wall thickness by partial restriction of the entering flow of the molten plastic material into the die head.

2 Claims, 2 Drawing Figures

PLASTICS EXTRUSION DIE HEAD IMPROVEMENT

This invention relates to an improved plastic extrusion die head and more particularly pertains to an improved plastic extrusion blow molding die head which permits the formation of extruded parisons of uniformly controlled wall thickness by preferentially restricting the entering melt flow of the plastic material into the die head.

The invention is more readily illustrated by the particular embodiment shown in the accompanying drawing.

Figure 1:
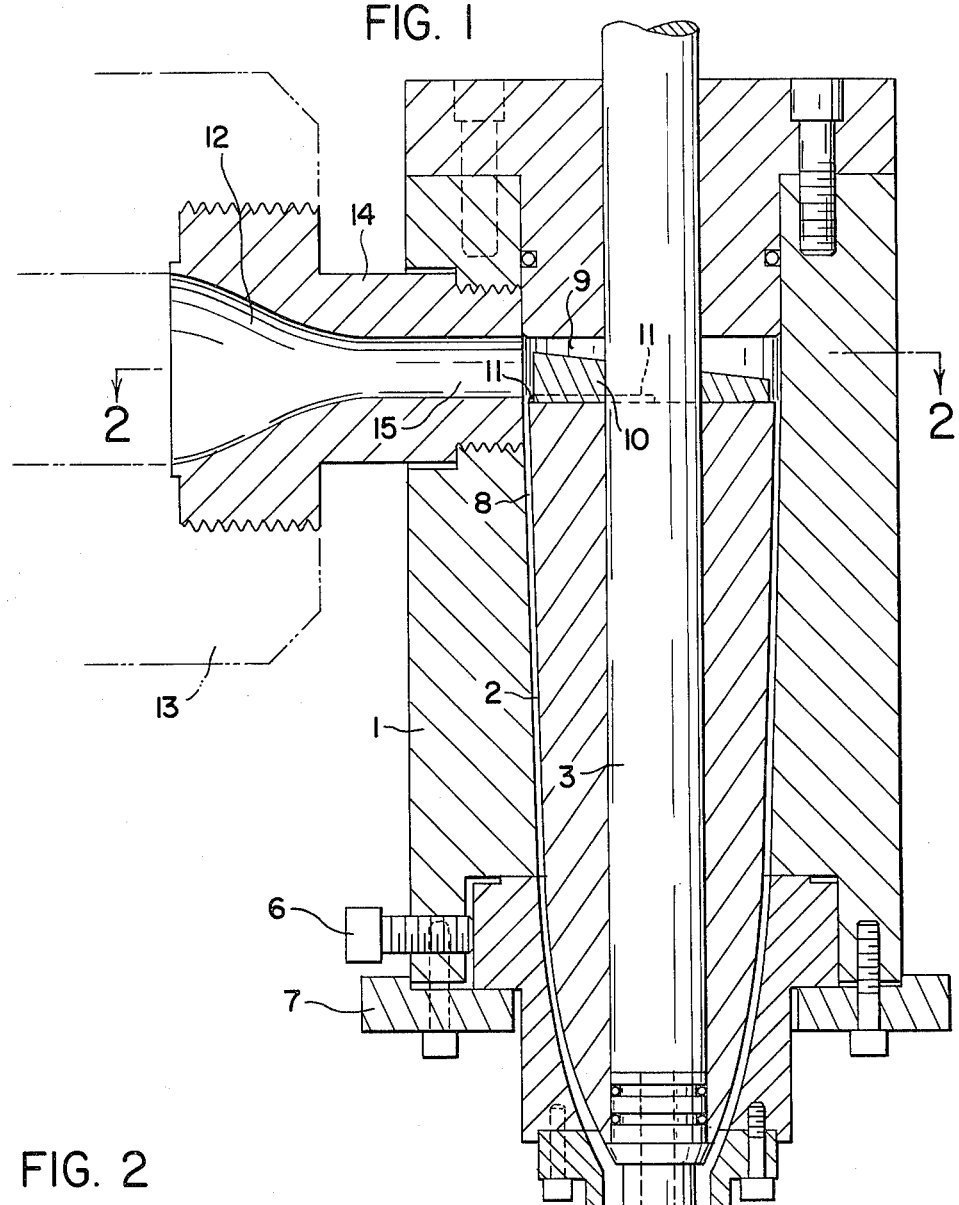
FIG. 1 is a side sectioned elevation of the die head of the present invention.
Figure 2:
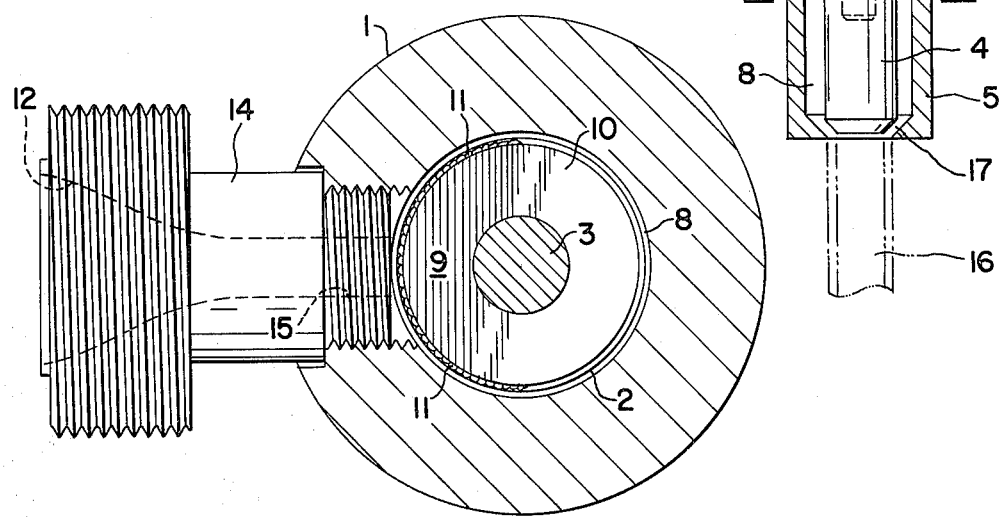
FIG. 2 is a view taken along line 2—2 in FIG. 1.

The apparatus of this invention comprises a die body and having an internal, somewhat generally conical hollow area fitted with a stationary tubular cone 2. A vertically movable internal shaft 3 extends through the cone 2 and protruding at the bottom end thereof is a core pin 4 which extends into and near the end of the opening in the die bushing 5. The die bushing 5 is equipped with an adjusting screw 6 for horizontal adjustment of the die bushing 5 and is also equipped with a die bushing retainer 7.

A fixed gap 8 is provided in the die body 1 through which the plastic melt passes on its way out of the die bushing 5.

Near the top of the die body 1 is a channel for plastic flow 9 created near an insert ring 10 which is located at the top of the tubular cone 2. An obstruction which can be in the form of a welded bead 11 is located at the bottom of the insert ring 10 and extends for about half the circumference of the tubular cone in the area where the plastic melt enters the channel for plastic flow 9. The plastic melt is supplied to the die body by an extruder (not shown) which is usually equipped with at least one screw. The end of the extruder is equipped with a screw tip 12 which is located at the end of the extruder barrel 13. Adapter 14 having an orifice 15 connects the screw tip 12 of the extruder to the die body 1 and allows passage of the plastic melt from the end of the extruder into channel 9 and through the die bushing 5.

The plastic parison 16 (in phantom) emerges from the die body 1 through an adjustable gap 17 the width of which can be varied in one dimension by vertical adjustment of the internal shaft 3 and correspondingly core pin 4.

The novel extrusion blow molding die head of the present invention allows balanced flow of the plastic out of the orifice in the production of parisons. The parisons are subsequently used in the blow molding of bottles and the like. This is especially important in the use of "programming heads" where any unbalanced flow of plastic causes the extrudate to "hook" and have poor temperature uniformity.

The apparatus of the present invention is particularly useful in the extrusion blow molding of viscous resins such as the high nitrile barrier resins some of which are described in U.S. Pat. Nos. 3,426,102, 3,586,737 and 3,763,278 as well as rigid polyvinyl chloride and others.

We claim:

1. In an extrusion blow molding die head comprising a die body equipped with a removable die bushing, said die body having an internally, somewhat generally conical hollow area fitted with a stationary tubular cone through which extends a movable internal shaft having a core pin which extends into and near the end of the opening in the die bushing said die body also having a fixed gap and a channel for plastic flow near an insert ring located at the top of said tubular cone, the improvement comprising an obstruction located at the bottom of the insert ring and extending about half the circumference of the tubular cone in the area where the plastic enters the channel for plastic flow.

2. The apparatus of claim 1 wherein the obstruction is in the form of a welded bead.

* * * * *